United States Patent [19]

Aratani et al.

[11] Patent Number: 5,018,119

[45] Date of Patent: May 21, 1991

[54] METHOD FOR REPRODUCING SIGNAL USING AN EXTERNAL MAGNETIC FIELD FROM MAGNETO-OPTICAL RECORDING MEDIUM HAVING THREE MAGNETIC LAYERS

[75] Inventors: Katsuhisa Aratani, Chiba; Minoru Kohno; Kenjiro Watanabe, both of Tokyo, all of Japan

[73] Assignee: Sony Corporation, Tokyo, Japan

[21] Appl. No.: 278,011

[22] Filed: Nov. 30, 1988

[30] Foreign Application Priority Data

Nov. 30, 1987 [JP] Japan .................. 62-301922
Nov. 30, 1987 [JP] Japan .................. 62-301923

[51] Int. Cl.⁵ .................. G11B 13/04; G11B 11/14
[52] U.S. Cl. .................. 369/13; 360/59; 360/114; 365/122
[58] Field of Search .......... 369/13; 365/122; 360/114, 59, 131; 428/695, 900

[56] References Cited

U.S. PATENT DOCUMENTS 4,878,132 10/1989 Aratani et al. .................. 369/13
4,932,012 6/1990 Kobayashi .................. 369/13

Primary Examiner—Stuart S. Levy
Assistant Examiner—Hoa Nguyen
Attorney, Agent, or Firm—Hill, Van Santen, Steadman & Simpson

[57] ABSTRACT

A method of reproducing a signal from a magneto-optical recording medium is disclosed in which the medium is formed of a first magnetic film, a second magnetic film and a third magnetic film which are magnetically coupled to one another at room temperature $T_{RT}$, wherein the Curie points $Tc1$, $Tc2$ and $Tc3$ of the first, second and third magnetic films are in the relationship of $Tc2 > T_{RT}Tc2 < Tc1$, and $Tc2 < Tc3$, and the coercive force $Hc1$ of the first magnetic film is small in the vicinity of the Curie point $Tc2$ of the second magnetic film, and the coercive form $Hc3$ of the third magnetic film is larger than a minimum required magnetic field intensity within a temperature range between the room temperature TRT and a predetermined temperature $T_{PB}$ which is higher than the Curie point $Tc2$ of the second magnetic film. A signal is reproduced from the magneto-optical recording medium by heating it to the predetermined temperature $T_{BP}$ so as to interrupt the magnetic coupling between the first and third magnetic films when a magnetic field is applied.

4 Claims, 8 Drawing Sheets

METHOD FOR REPRODUCING SIGNAL USING AN EXTERNAL MAGNETIC FIELD FROM MAGNETO-OPTICAL RECORDING MEDIUM HAVING THREE MAGNETIC LAYERS.

BACKGROUND OF THE INVENTION

The present invention relates to a method of reproducing a signal from a magneto-optical recording medium by reading out data bits (magnetic domains) through the magneto-optical interaction.

In a magneto-optical recording/reproducing method which forms data bits or bubble magnetic domains with irradiation of a laser beam to heat a recording medium locally and reads out the signal by utilizing the magneto-optical interaction, it is necessary, for increasing the magneto-optical recording density, to shorten the length of each bit length, i.e. to minimize the data magnetic domain. However, in the ordinary magneto-optical recording/reproducing system known generally, such attempt is limited by the wavelength of the laser beam in a reproducing mode, the numerical aperture of the lens and so forth for ensuring a satisfactory S/N in a reproducing operation. Under the current technical circumstances, for example, it is impossible to read out a data bit (magnetic domain) of 0.2 μm with a laser beam having a spot diameter of 1 μm.

OBJECT AND SUMMARY OF THE INVENTION

Accordingly, it is an object of the present invention to provide a method for reproducing signals from a magneto-optical recording medium in which closely provided bits can be separately reproduced, to enable a high density recording.

It is another object of the present invention to provide a method for reproducing signals from a magneto-optical recording medium to provide an improved signal to noise ratio.

According to the present invention there is provided a method of reproducing a signal from a magneto-optical recording medium in which the medium is formed of a first magnetic film, a second magnetic film and a third magnetic film magnetically coupled to one another at room temperature $T_{RT}$, wherein the Curie points $Tc1$, $Tc2$ and $Tc3$ of the first, second and third magnetic films are in the relationship of $Tc2 > T_{RT}$, $Tc2 < Tc1$, and $Tc2 < Tc3$, and the coercive force $Hc1$ of the first magnetic film is sufficiently small in the vicinity of the Curie point $Tc2$ of the second magnetic film, while the coercive force $Hc3$ of the third magnetic film is sufficiently greater than a required magnetic field intensity within a temperature range between the room temperature $T_{RT}$ and a predetermined temperature $T_{PB}$ higher than the Curie point $Tc2$ of the second magnetic film, and in reproducing a signal from the magneto-optical recording medium, the medium is heated to the predetermined temperature $T_{PB}$ to interrupt the magnetic coupling between the first and third magnetic film under an application of magnetic field to cause the change of the domain size in the first magnetic film.

DESCRIPTION OF THE PREFERRED EMBODIMENTS

Figure 1:
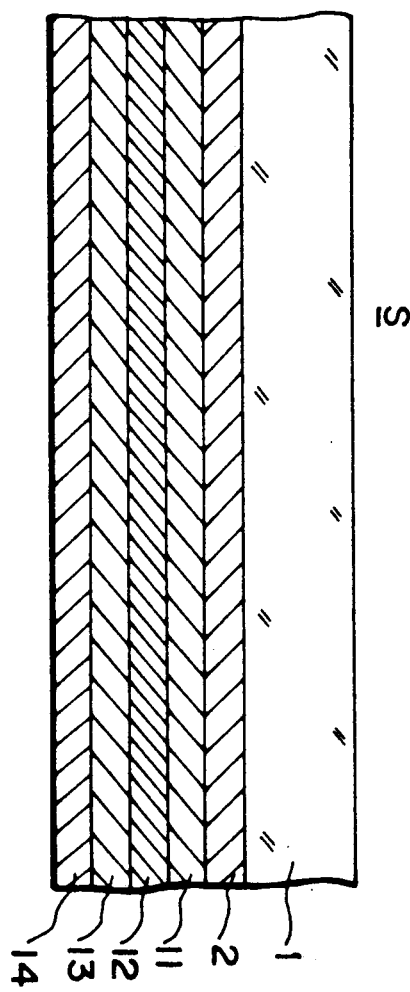
FIG. 1 schematically shows the structure of a magneto-optical recording medium used in the method of the present invention.

The present invention uses a magneto-optical recording medium S having, on its light transmitting substrate 1 as shown in FIG. 1, a transparent dielectric film 2 formed when necessary to serve as a protective film or interference film, and further having thereon a first magnetic film 11, a second magnetic film 12 and a third magnetic film 13 which are magnetically coupled to one another at room temperature $T_{RT}$ and have anisotropy perpendicular to the film surface, wherein the respective Curie points $Tc1$, $Tc2$ and $Tc3$ of the first, second and third magnetic films 11, 12 and 13 are so selected as to have the relationship of $Tc2 > T_{RT}$ an $Tc2 < Tc1$, $Tc2 < Tc3$. The coercive force $Hc1$ of the first magnetic film 11 is sufficiently small in the vicinity of the Curie point $Tc2$ of the second magnetic film 12, and the coercive force $Hc3$ of the third magnetic film 13 is sufficiently greater than a required magnetic field intensity within a temperature range from the room temperature $T_{RT}$ and a predetermined temperature $T_{PB}$ higher than the Curie point $Tc2$ of the second magnetic film 12.

In the reproduction from such recording medium, the data bits or the recorded magnetic domains of the first magnetic film 11 are expanded or shrinked by the combination of a demagnetizing field or a stray magnetic field from the medium applied thereto and an external magnetic field is applied when necessary at the aforesaid predetermined temperature $T_{PB}$ above the Curie point $Tc2$ of the second magnetic film 12, and then the signal is read out in such state.

If necessary, a surface protective film 14 is further formed on the third magnetic film 13.

In recording the magneto-optical recording medium S to form data magnetic domains, as is generally known, a laser beam is focused and irradiated while a bias magnetic field is applied in the direction which is reversed to the perpendicular magnetization of the first to third magnetic films 11 to 13 in the initial state, whereby the first to third magnetic films 11 to 13 are heated to above the respective Curie points. In the cooling stage after scanning with the laser beam, a bubble magnetic domain which is inverted directionally by the external magnetic field and the stray magnetic field is formed to record, for example, data "1". That is, binary data "1" or "0" is recorded in accordance with the presence or absence of such data bubble magnetic domain.

Particularly in the present invention in order to read out or reproduce the recorded data from such magneto-optical recording medium S, the medium portion to be read out is heated with irradiation from a laser beam or the like, up to the predetermined temperature $T_{PB}$ above the Curie point $Tc2$ of the second magnetic film 12, so that the mutual magnetic coupling between the first and third magnetic films 11 and 13 is interrupted when the recorded data is read out in accordance with the Kerr rotation angle or the Faraday rotation angle resulting from the magneto-optical interaction which depends on the presence or absence of the magnetic domain. In this state, therefore, the first magnetic film 11 is rendered free from any magnetic restriction of the third magnetic film 13, and the recorded-data magnetic domain is expanded or shrinked by the required magnetic field which corresponds to the sum of a demagnetizing field and an external magnetic field appllied when necessary, and also by the reduction of the coercive force of the first magnetic film 11 caused at the temperature $T_{PB}$.

As hereinafter explained with reference to FIGS. 4C and 4D, the output changes during playback operation, due to the expansion or shrinkage of the data bits allow, the signal to be obtained by differentiation of the output signal propositional to the Kerr rotation angle. In this case two closely recorded data bits can be separately reproduced so as to enable high density recording.

Further, if the first magnetic film 11 is composed of a suitable material adapted to attain a large Kerr rotation angle or Faraday rotation angle, the substantial area of the data magnetic domain can be increased due to the recorded data principally on the first magnetic film 11 so as to consequently provide a greater reproduction output, hence further improving the S/N ratio.

Since the reproduction is performed in a state where the recorded-data magnetic domain has been expanded with a substantial increase of the read magnetic domain area, it becomes possible to increase the reproduction output so as enhance the S/N.

The read portion of the recording medium is cooled after reproduction of the data with displacement of the irradiation by the scanning laser beam, so that the third magnetic film 13 of which has a high coercive force functions as a magnetic recording retainer layer in the process where the first to third magnetic films 11 to 13 are cooled to, e.g. the room temperature $T_{RT}$, and the resultant magnetization of the third magnetic film 13 acts to magnetize the second magnetic film 12 by magnetic coupling, then to magnetize the first magnetic film 11 coupled thereto magnetically, whereby the databit magnetic domain in the initial recording state is formed again so as to resume the recording state.

According to the present invention, as described hereinabove, the second magnetic film 12 which serves as an intermediate layer of the magneto-optical recording medium S is selectively placeable in either a magnetically coupled state or a magnetically interrupted state between the first and third magnetic films 11 and 13, so that in a reproducing operation, the second intermediate magnetic film 12 magnetically separates the first and third magnetic films 11 and 13 from each other so as to enable the expansion or shrinkage of the data-recorded magnetic domain of the first magnetic film 11. Therefore, the third magnetic film 13 maintains its function as a magnetic recording retainer layer so as to retain its magnetization, while the first magnetic film 11 functions as a reproducing layer so as to provide higher separation of signals so as to enable high recording density and an enhanced reproduced output when expansion of the magnetic domain occurs. Consequently, the recording density can be increased so as to ensure a sufficiently high reproduced output despite a minimization of the magnetic domain for bit data, so that higher density is attained during recording.

Figure 2A:
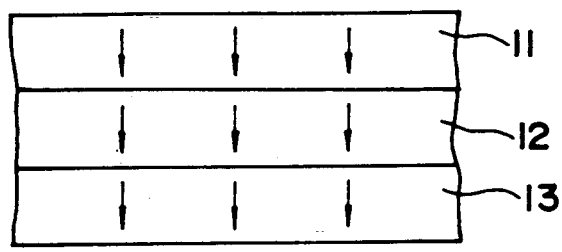
FIGS. 2A through 2D illustrate the states of magnetization obtained by the method of the invention.
Figure 2B:
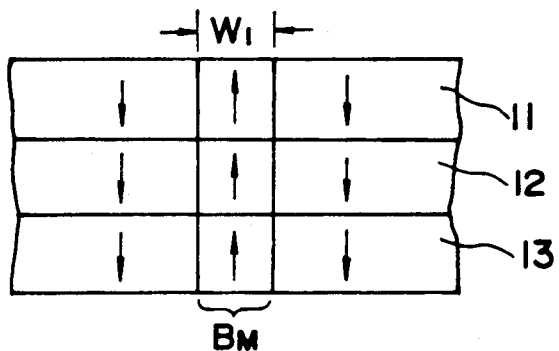

Now referring to FIGS. 2A-2D, a description will be given of the state of magnetization which is obtained when each of the first to third magnetic films 11 to 13 is composed of ferromagnetic material. Suppose that the magnetic films 11 to 13 in an initial nonrecorded state have unidirectional perpendicular magnetizations as shown in FIG. 2A. When data "1" is recorded, a data bit or a data magnetic domain $B_M$ is formed which has the magnetization directionally reversed relative to the initial state, as shown in FIG. 2B.

Figure 2C:
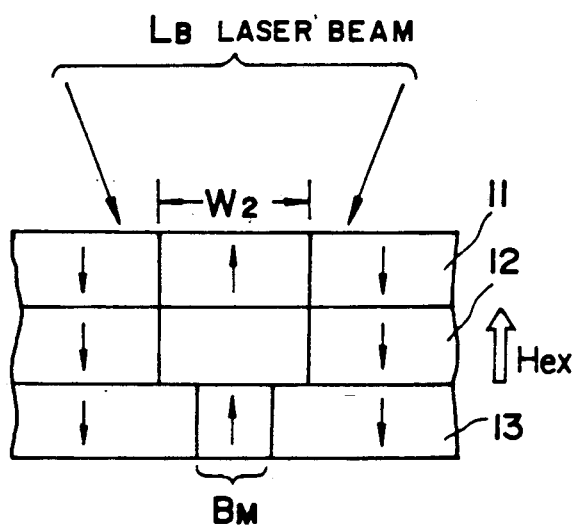

During read out of the data magnetic domain $B_M$ thus formed, a laser beam $L_B$ is irradiated on the data magnetic domain $B_M$ as shown in FIG. 2C in a manner such that, as described previously, the aforesaid predetermined temperature $T_{PB}$ is obtained at the center, for example, of the irradiated portion. In this stage, the second magnetic film 12 is heated beyond its Curie point $T_{c2}$ so that the magnetism thereof is lost, whereby the magnetic coupling between the first and third magnetic films 11 and 13 is interrupted. When an external magnetic field $H_{ex}$ is applied at such time in the same direction as the external bias magnetic field which is applied in the recording operation, i.e., in the direction of the original magnetization of the magnetic domain $B_M$ or that of the recording mode, then the magnetic domain $B_M$ of the first magnetic film 11, which has a coercive force $H_{c1}$ which is rendered smaller at the temperature $T_{PB}$, is expanded by the sum of such external magnetic field and the demagnetizing field.

Figure 2D:
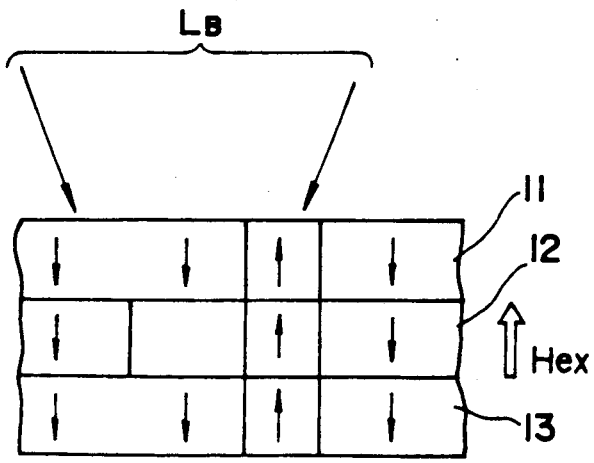

In a state where the laser beam $L_B$ is irradiated outside of the data magnetic domain $B_M$ as shown in FIG. 2D, the temperature rise caused in the data magnetic domain is relatively small, so that there occurs substantially no expansion of the data bit or magnetic domain $B_M$. Thus, it becomes possible to expand only the data-recorded magnetic domain $B_M$ which exists at the center of the magnetic domains $B_M$ in the central area of the laser beam which scans during the read mode.

Figure 3A:
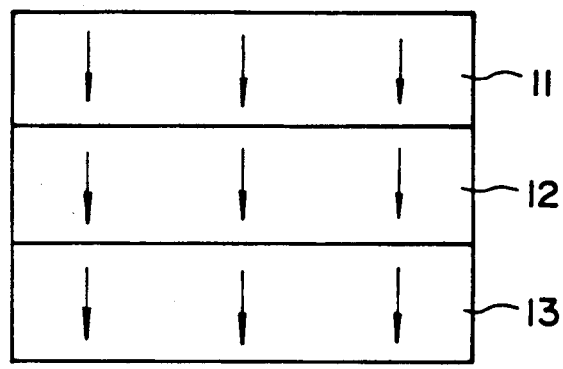
FIGS. 3A through 3C illustrate the states of magnetization obtained by another method of the invention.
Figure 3B:
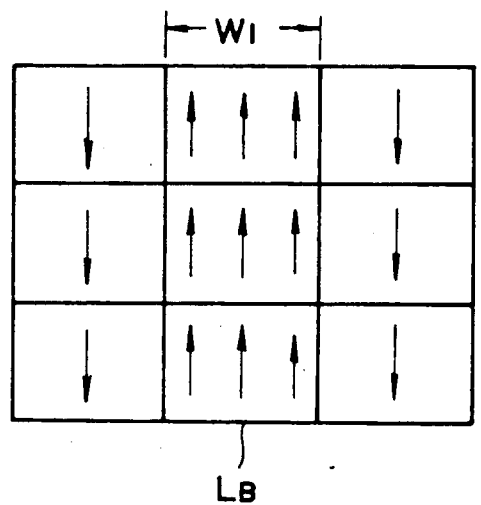
Figure 3C:
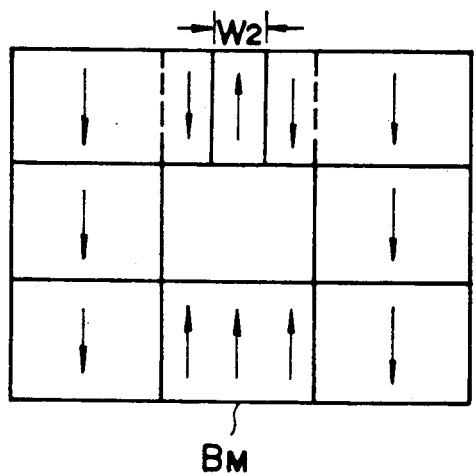

Referring to FIGS. 3A-3C, a description will be given with regard to the state of magnetization obtained when each of the first to third magnetic films 11 to 13 is composed of ferromagnetic material in another example. Suppose that the magnetic films 11 to 13 in an initial nonrecorded state have unidirectional perpendicular magnetization as shown in FIG. 3A. And when data "1" is recorded, a data bit or a data magnetic domain $B_M$ is formed with the magnetization which is directionally reverse to the initial state, as shown in FIG. 3B. When reading out the data magnetic domain $B_M$ thus formed, a laser beam $L_B$ is irradiated on the data magnetic domain $B_M$ as shown in FIG. 3C in a manner such that, as described previously, the aforesaid predetermined temperature $T_{PB}$ is obtained at the center, for example, of the irradiated portion. In this stage, the second magnetic film 12 is heated beyond its Curie point $T_{c2}$ so that the magnetism is lost, whereby the magnetic coupling between the first and third magnetic films 11 and 13 is interrupted. When an external magnetic field $H_{ex}$ is applied in such a state in a direction which is reverse to the external bias magnetic field which is applied during the recording operation, i.e. in the direction of the original magnetization of the magnetric domain $B_M$ or in the direction in the recording mode, then the magnetic domain $B_M$ of the first magnetic film 11, whose coercive force $H_{c1}$ is rendered smaller at the temperature $T_{PB}$, shrinks to, e.g. a width $W_2$ or is inverted by the combination of such external magnetic field Hex and the demagnetization field.

Accordingly, if the data reproduced from the magnetic domain $B_M$ is output in the form of, for example, a differential change in the Kerr rotation angle, a large output will be obtained. Since the first magnetic film 11 has the function of a reproducing layer so as to enhance the reproduction output by shrinking or inverting the magnetic domain in the reproducing operation, it becomes possible to obtain a sufficiently large reproduced output despite the minimization of the magnetic domain as bit data, hence which obtains a higher recording density.

Figure 4A:
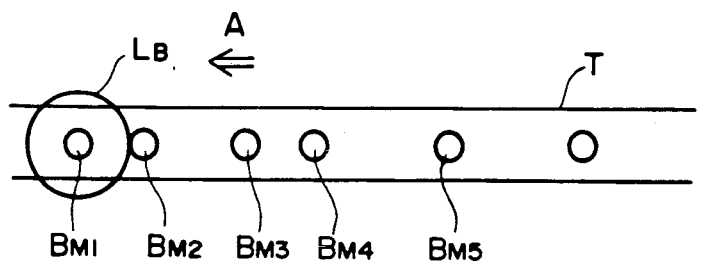
FIGS. 4A through 4D show the recorded bits on the magneto-optical recording medium and output waveforms.

FIG. 4A shows the relationship between recorded bits $B_{M1}$, $B_{M2}$... formed in a guide truck T and a laser beam spot $L_B$ which has a much larger diameter than the recorded bits.

In FIG. 4A the arrow A indicates the moving direction of the magneto-optical recording medium.

Figure 4B:
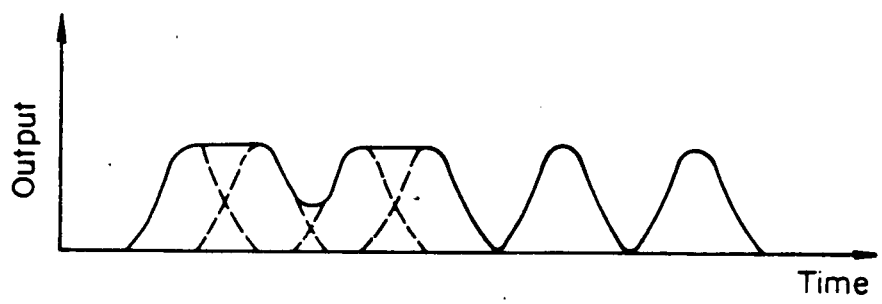

In FIG. 4B, the solid line shows an output waveform from the magneto-optical recording medium having recorded bits as shown in FIG. 4A obtained with a conventional method without causing the expansion or shrinkage of the recorded bits. In such conventional method the recorded bits $B_{M1}$ and $B_{M2}$ can't be separately reproduced, because the signals obtained from each of the recorded bits $B_{M1}$, $B_{M2}$ which are indicated by the dotted line, overlap with each other.

Figure 4C:
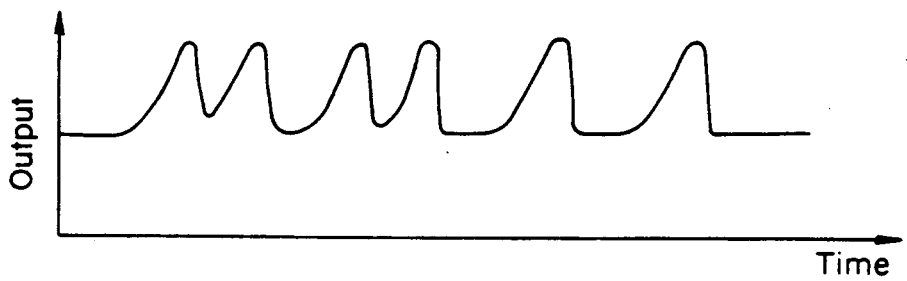

FIG. 4C shows an output waveform from the magneto-optical recording medium of FIG. 4A, when the recorded bits are expanded during playback, and where the closely provided bits $B_{M1}$, $B_{M2}$ can be separately reproduced.

Figure 4D:
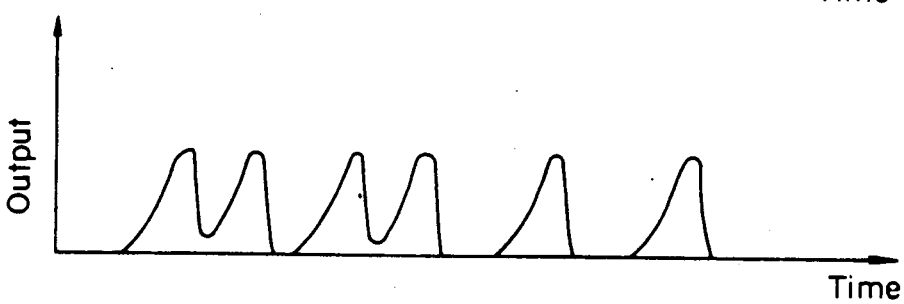

FIG. 4D shows an output waveform when the recorded bits are shrinked during playback.

Figure 5A:
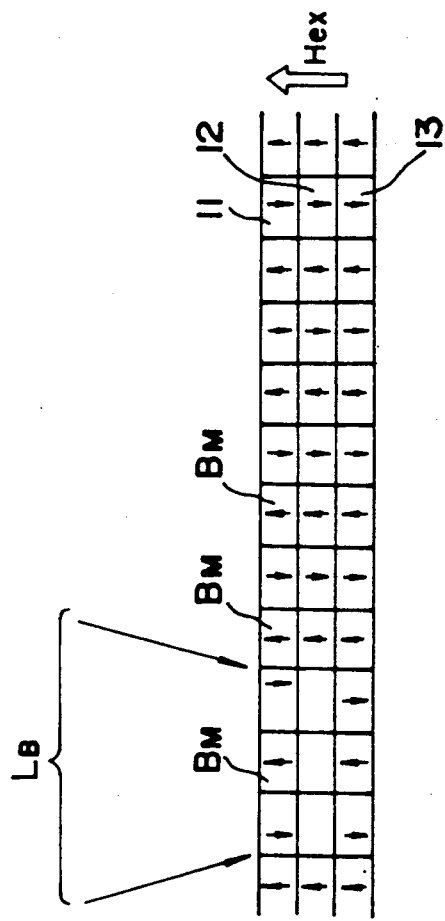
FIGS. 5A and 5B show the waveform of a reproduction output with the states of magnetization.
Figure 5B:
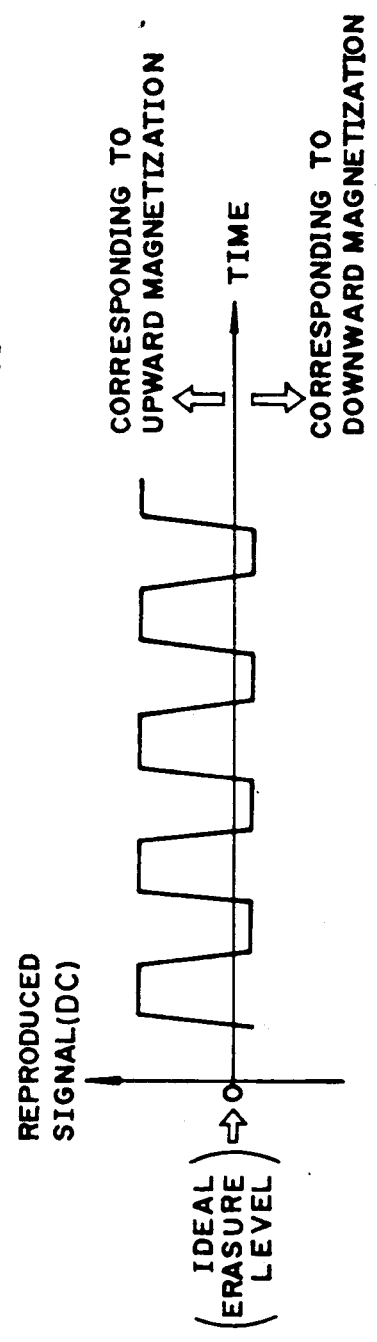

Consequently, when the laser beam scanning is carried out on the magnetic recording medium where data-recorded magnetic domains $B_M$ are arrayed at equal intervals as shown in FIG. 5A, the output obtained by reading out the magnetic domain $B_M$ has the waveform of FIG. 5B in which a higher level is indicated in the direction upward as compared with an ideal demagnetization level during erasing of the magnetic domain $B_M$, in case the domain is expanded during playback.

Practically, when the first to third magnetic films 11 to 13 are composed of rare-earth and transition metals and have ferrimagnetism such that the sublattice magnetization of the transition metal and that of the rare-earth metal are directionally opposite to each other, it is necessary to selectively determine the direction of an external magnetic field Hex, which is applied during a reproducing operation, in accordance with whether the sublattice magnetization of the transition metal or that of the rare-earth metal is dominant in each magnetic film.

Such determination will now be described below in detail. Relative to the direction of an external magnetic field Hex applied in a reproducing operation, the direction of an external bias magnetic field which is applied during a recording operation is used as a reference, and separate considerations are made as to whether the saturation magnetization of the third magnetic film 13, which occurs immediately below the Curie point Tc3 thereof and dominates the recording direction, is in a transition metal sublattice dominant state or in a rare-earth sublattice dominant state. Here, the demagnetizing field and the stray magnetic field which are applied to the data magnetic domain $B_M$ in the first magnetic film 11 are neglected from the consideration.

[1-1] In case the magnetization of the third magnetic film 13 is in a transition metal sublattice dominant state immediately below the Curie point Tc3:

(1-1a) When the magnetization of the first magnetic film 11 is in a transition metal sublattice dominant state in the vicinity of the Curie point Tc2 of the second magnetic film 12, the data-recorded magnetic domain $B_M$ can be expanded by applying, during the reproducing operation, an external magnetic field in the same direction as the external magnetic field which is applied during the recording operation.

(1-1b) When the magnetization of the first magnetic film 11 is close to zero in the vicinity of the Curie point Tc2 of the second magnetic film 12, the temperature during the reproducing operation is further raised beyond the vicinity of the Curie point Tc2 of the second magnetic film 12 so that the magnetization of the first magnetic film 11 is placed in a transition metal sublattice dominant state. In this case, the bubble magnetic domain $B_M$ can be expanded by applying an external magnetic field Hex in the same direction as in the recording mode.

(1-1c) When the magnetization of the first magnetic film 11 is in a rare-earth sublattice dominant state in the vicinity of the Curie point Tc2 of the second magnetic film 12, the magnetic domain $B_M$ can be expanded by applying, during the reproducing operation, an external magnetic field Hex in the direction reverse to that in the recording mode.

[2-1] In case the magnetization of the third magnetic film 13 is in a rare-earth sublattice dominant state immediately below the Curie point Tc3 thereof:

(1-2a) When the magnetization of the first magnetic film 11 is in a transition metal sublattice dominant state in the vicinity of the Curie point Tc2 of the second magnetic film 12, the bubble magnetic domain $B_M$ can be expanded by applying, during the reproducing operation, an external magnetic field Hex in the direction which is reverse to that used in the recording mode.

(1-2b) When the magnetization of the first magnetic film 11 is close to zero in the vicinity of the Curie point Tc2 of the second magnetic film 12, the temperature $T_{PB}$ in the reproducing operation is further raised beyond the vicinity of the Curie point Tc2 of the second magnetic film 12 so that the magnetization of the first magnetic film 11 is placed in a transition metal sublattice dominant state. In this case, the magnetic domain $B_M$ can be expanded by applying an external magnetic field Hex in the direction which is reverse to that used in the recording mode.

(1-2c) When the magnetization of the first magnetic film 11 is in a rare-earth sublattice dominant state in the vicinity of the Curie point Tc2 of the second magnetic film 12, the bubble magnetic domain $B_M$ can be expanded by applying, during the reproducing operation, an external bias magnetic field Hex which has the same direction as in the recording mode.

[1-2] In case the magnetization of the third magnetic film 13 is in a transition metal sublattice dominant state immediately below the Curie point Tc3:

(2-1a) When the magnetization of the first magnetic film 11 is in a transition metal sublattice dominant state in the vicinity of the Curie point Tc2 of the second magnetic film 12, the data-recorded magnetic domain $B_M$ can be contracted or inverted by applying, during the reproducing operation, an external magnetic field in the direction which is reverse to that used during the recording mode.

(2-1b) When the magnetization of the first magnetic film 11 is close to zero in the vicinity of the Curie point Tc2 of the second magnetic film 12, the temperature during the reproducing operation is further raised beyond the vicinity of the Curie point Tc2 of the second magnetic film 12 so that the magnetization of the first magnetic film 11 is placed in a transition metal sublattice dominant state. In this case, the bubble magnetic domain $B_M$ can be contracted or inverted by applying an external magnetic field Hex in the direction which is reversed to that used in the recording mode.

(2-1c) When the magnetization of the first magnetic film 11 is in a rare-earth sublattice dominant state in the vicinity of the Curie point Tc2 of the second magnetic film 12, the magnetic domain $B_M$ can be contracted or reversed by applying during the reproducing operation, an external magnetic field Hex which has the same direction as in the recording mode.

[2-2] In case the magnetization of the third magnetic film 13 is in a rare-earth sublattice dominant state immediately below the Curie point Tc3 thereof:

(2-2a) When the magnetization of the first magnetic film 11 is in a transition metal sublattice dominant state in the vicinity of the Curie point Tc2 of the second magnetic film 12, the bubble magnetic domain $B_M$ can be contracted or inverted by applying, during the reproducing operation, an external magnetic field Hex which has the same direction as in the recording mode.

(2-2b) When the magnetization of the first magnetic film 11 is close to zero in the vicinity of the Curie point Tc2 of the second magnetic film 12, the temperature $T_{PB}$ during the reproducing operation is further raised beyond the vicinity of the Curie point Tc2 of the second magnetic film 12 so that the magnetization of the first magnetic film 11 is placed in a transition metal sublattice dominant state. In this case, the magnetic domain $B_M$ can be contracted or inverted by applying an external magnetic field Hex which has the same direction as that used in the recording mode.

(2-2c) When the magnetization of the first magnetic film 11 is in a rare-earth sublattice dominant state in the vicinity of the Curie point Tc2 of the second magnetic film 12, the bubble magnetic domain $B_M$ can be contracted or inverted by applying, during the reproducing operation, an external bias magnetic field Hex in the direction which is reverse to that used in the recording mode.

EXAMPLE

The substrate 1 is composed of a transparent material such as glass plate, plastic plate of acrylic resin, polycarbonate resin or the like and, although not shown, track grooves are formed for a tracking servo on one side of the substrate with a pitch of, for example, 1.6 μm. A dielectric film 2 composed of $Si_3N_4$, first to third magnetic films 11 to 13, and further a protective film 14 are formed sequentially on the substrate 1 by the technique of continuous evaporation or sputtering performed by, for example, a magnetron sputtering apparatus.

The first magnetic film 11 may be composed of GdCo, GdFeCo, GdFe or the like; the second magnetic film 12 may be composed of DyFe, DyFeCo, TbFe or the like; and the third magnetic film 13 may be composed of TbFe, TbFe Co, DyFeCo or the like and the composition of each layer is selected so as to give suitable Tc and Hc characteristics. In the third magnetic film 13, there are formable magnetic domains $B_M$ each having a diameter which is smaller than 0.1 μm.

A magneto-optical recording medium known as an optical disc S was produced by sequentially depositing, on a glass substrate having track grooves with a pitch of 1.6 μm, a dielectric film 2 of $Si_3N_4$, a first magnetic film 11 of GdFeCo, a second magnetic film of DyFeCo, a third magnetic film 13 of DyFeCo, and a protective film 14 of $Si_3N_4$ in the form of superposed layers with continuous sputtering performed by a magnetron sputtering apparatus. Table 1 lists below the respective thicknesses and magnetic characteristics of such magnetic films 11 to 13 as individual layers.

TABLE 1

|  | Material | Thickness (Å) | Curie point (°C.) | Holding force (KOe) |
| --- | --- | --- | --- | --- |
| Magnetic film 11 | GdFeCo | 450 | >330 | 0.2 (FeCo rich) |
| Magnetic film 12 | DyFeCo | 100 | 93 | 10 (Dy rich) |
| Magnetic film 13 | DyFeCo | 600 | 195 | 20 (Dy rich) |

In Table 1, "FeCo rich" implies a film where the FeCo sublattice magnetization is dominant at room temperature, and "Dy rich" implies a film where the Dy sublattice magnetization is dominant at room temperature.

Figure 6:
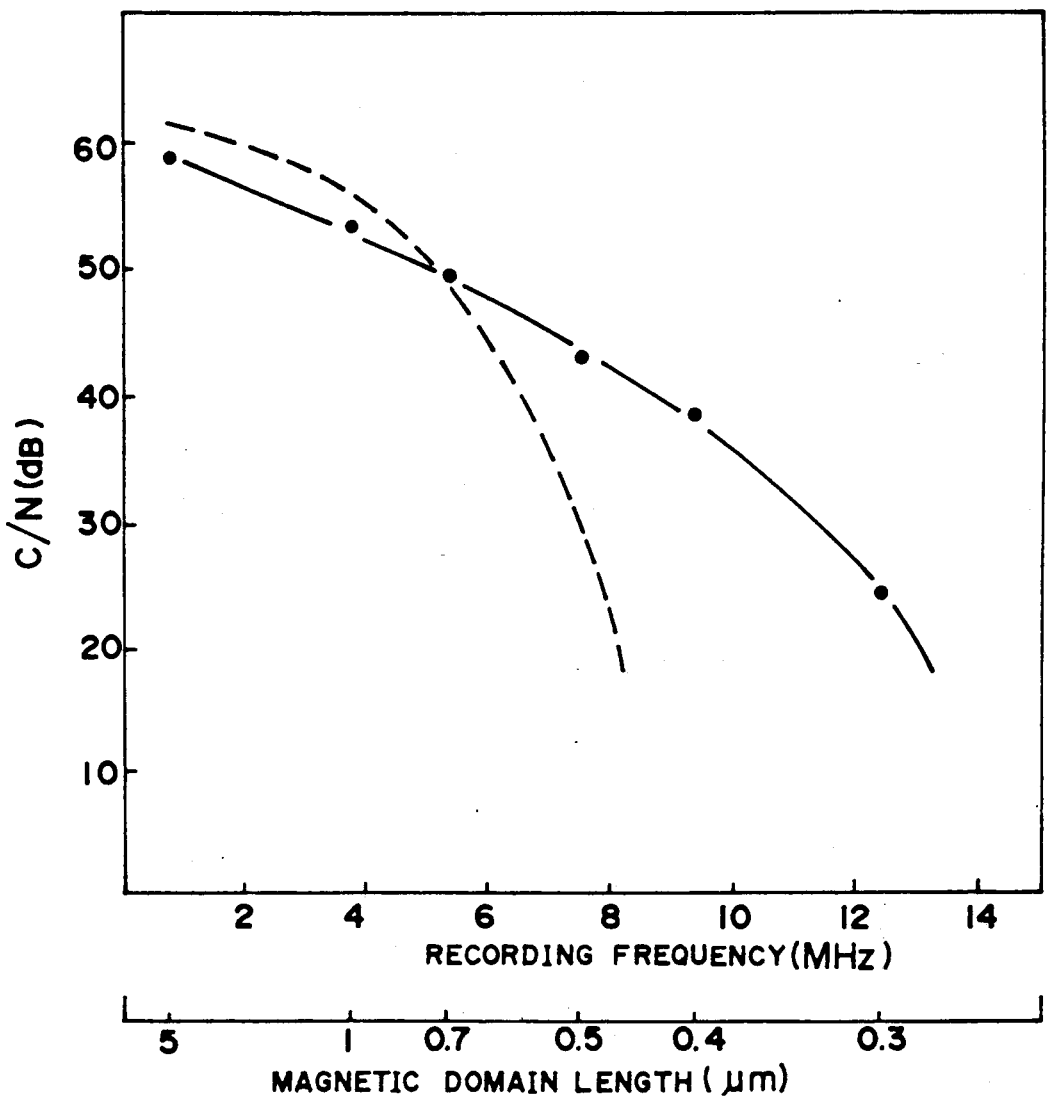
FIG. 6 graphically shows the reproduction characteristic curves in relation to recording frequencies.

FIG. 6 graphically shows the results of measuring the dependency of the carrier level-to-noise level (C/N) on the recording frequency in the magneto-optical recording medium S of Embodiment 1. In FIG. 6, a solid-line curve represents the characteristic obtained by the use of an objective lens having a numerical aperture N.A. of 0.50 and a pickup with a laser beam wavelength of 780 nm, under the conditions including a pickup linear velocity of 7.5 m/sec, a recording power of 7.0 mW, a recording external magnetic field intensity of 500 (Oe), a reproducing external magnetic field intensity set to zero, and a reproducing power of 3.5 mW. Also in FIG. 6, a dotted line curve represents the characteristic obtained with a reproducing power of 1.5 mW. When the reproducing power is set to 1.5 mW as in this example, the frequency dependency of the C/N achieved is the same as that in a conventional optical disc having merely a single layer of TbFeCo as the entire magnetic film. This seems to result from the phenomenon that, with the reproducing power of such a small value, the heating temperature fails to reach the Curie point Tc2 of the second magnetic film 12 and therefore the recorded magnetic domain is not deformed in the reproducing operation. When the reproducing power is 3.5 mW, in comparison with the above example of 1.5 mW, the C/N is remarkably increased in a range where the magnetic domain length or bit length l is smaller than 0.7 μm. Even when the bit length l is equal to 0.3 μm, a desired signal component is still obtained although the C/N is low. In this case, the external magnetic field Hex was zero at playback, and there is a stray field from the area surrounding the data bit. In a range where the bit length l is greater than 0.7 μm, the C/N is reduced to due to the increase of the noise N. It has been confirmed that if the medium portion once reproduced with a power of 3.5 mW is reproduced again, the C/N remains the same regardless whether the latter reproducing power is 1.5 mW or 3.5 mW.

If the laser beam power is maintained constant during the reproducing operation in Embodiment 1 mentioned above, the temperature profile is spread due to the thermal diffusion in the recording medium S, so that the resolution during reproducing the micro data bit (magnetic domain) will be deteriorated. A steep temperature profile is attained by performing reproduction with a pulse laser beam which has a narrow width at an interval of the frequency corresponding to the minimal bit length. Furthermore, for the purpose of inducing prompt radiation of the thermal energy which is absorbed into the magnetic film, a radiation film of high thermal conductivity such as an aluminum film may be deposited on the third magnetic film 13 (on the reverse side thereof with respect to the side in contact with the second magnetic film 12).

Figure 7:
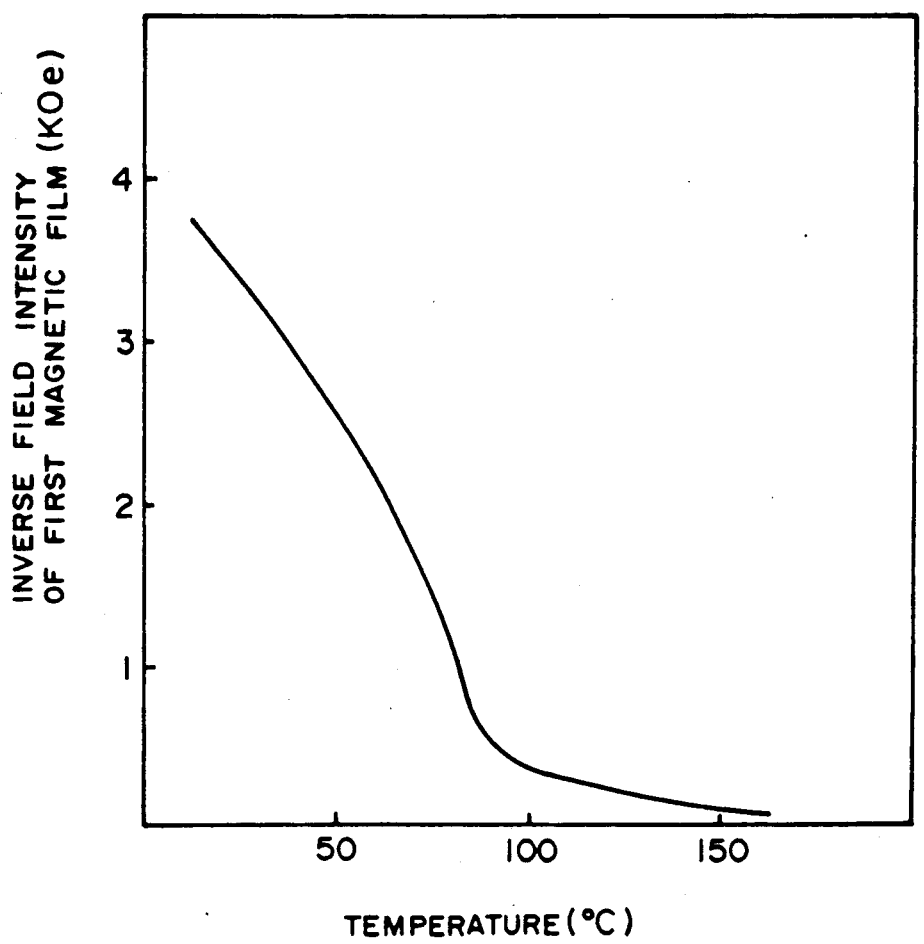
FIG. 7 graphically shows a characteristic curve representing the relationship between the temperature and the inverse field intensity of the magnetic film.
Figure 8:
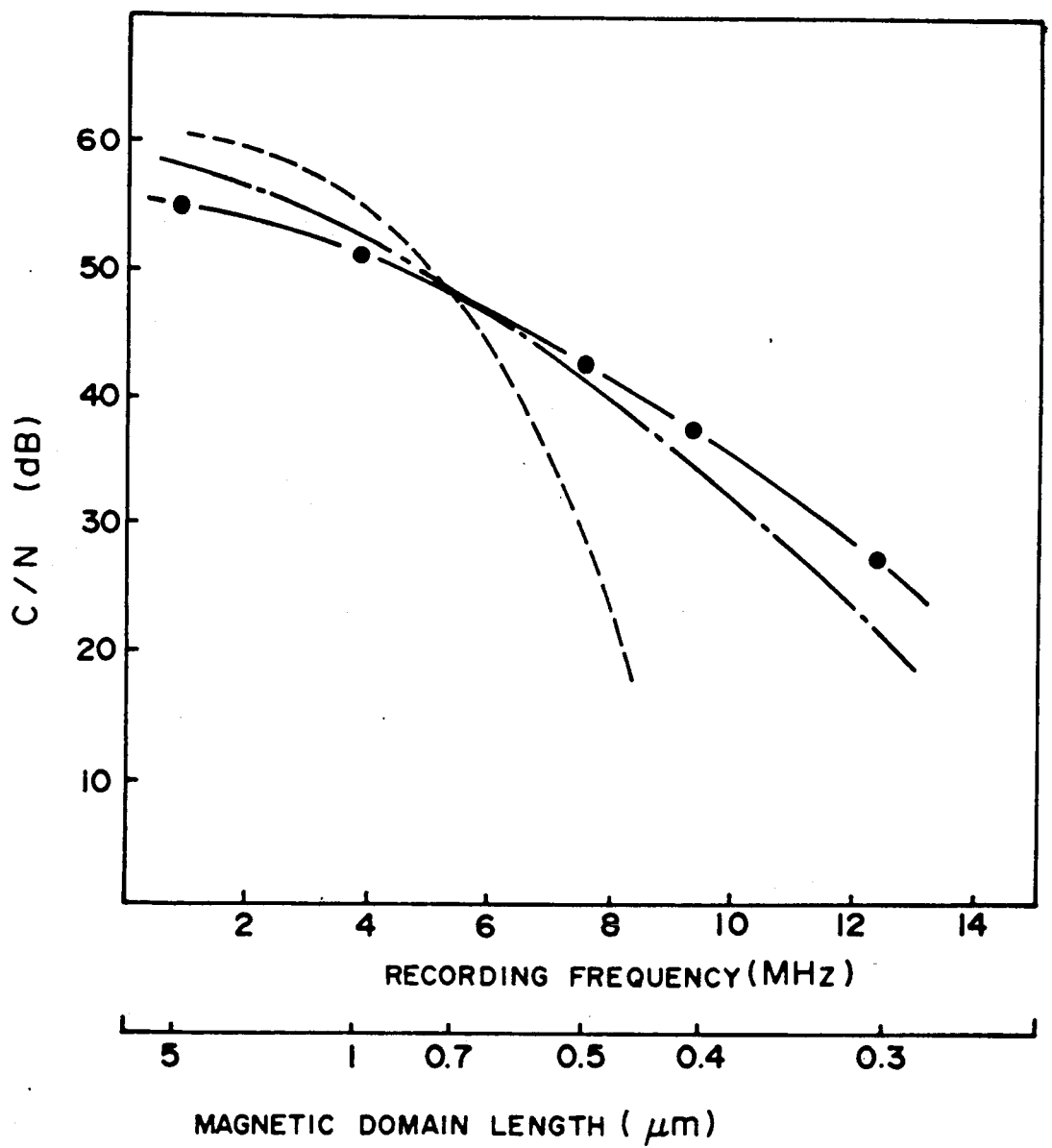
FIG. 8 graphically shows the reproduction characteristic curves in relation to recording frequencies.

FIG. 7 graphically shows a characteristic curve representing the relationship between the temperature and the inverse field intensity of the first magnetic film 11 in the magneto-optical recording medium S of the example. FIG. 8 graphically shows the results of measuring the dependency of the carrier level-to-noise level (C/N) on the recording frequency in the medium S. In FIG. 8, a solid-line curve represents the characteristic obtained by the use of an objective lens having a numerical aperture N.A. of 0.50 and a pickup with a laser beam wavelength of 780 nm, under the conditions including a pickup linear velocity of 7.5 m/sec, a recording power of 7.0 mW, a recording external magnetic field having an intensity of 500 (Oe), a reproducing external magnetic field having an intensity of 600 (Oe) and which is applied in the same direction as the recording external magnetic field, and a reproducing power of 3.5 mW. Also in FIG. 8, a broken-line curve represents the characteristic obtained with a reproducing power of 1.5 mW. When the reproducing power is set to 1.5 mW as in this example, the frequency dependency of the C/N achieved is the same as that in a conventional optical disc having only a single layer of TbFeCo as the entire magnetic film. This seems to result from the phenomenon that, with the reproducing power of such a small value, the heating temperature fails to reach the Curie point Tc2 of the second magnetic film 12 and therefore the recorded magnetic domain is not deformed during the recording operation. When the reproducing power is 3.5 mW, in comparison with the above example of 1.5 mW, the C/N is remarkably increased in a range where the magnetic domain length or bit length l is smaller than 0.7 μm. Even when the bit length l is equal to 0.3 μm, a desired signal component is still obtained although the C/N is low. In a range where the bit length l is greater than 0.7 μm, the C/N is reduced due to the increase of the noise N. Further in FIG. 8, a one-dot chain line represents the characteristic measured with a reproducing power of 3.5 mW (l<0.5 μm) and the external magnetic field intensity Hex is set to 0 (Oe). As shown, when the bit length l is smaller than 0.5 μm, the C/N obtained with Hex=600 (Oe) is higher than the ratio with Hex=0 (Oe).

It has been confirmed that if the medium portion once reproduced with a power of 3.5 mW is reproduced again, the C/N remains the same regardless of whether the latter reproducing power is 1.5 mW or 3.5 mW.

If the laser beam power is maintained constant during the reproducing operation in the Example mentioned above, the temperature profile is spread due to the thermal diffusion in the recording medium S, so that the resolution during reproducing the micro data bit (magnetic domain) is deteriorated. A steep temperature profile is attainable by performing reproduction with a pulse laser beam having a narrow width at an interval of the frequency corresponding to the minimal bit length. Furthermore, for the purpose of inducing prompt radiation of the thermal energy absorbed into the magnetic film, a radiation film of high thermal conductivity such as an aluminum film may be deposited on the third magnetic film 13 (on the reverse side thereof with respect to the side in contact with the second magnetic film 12).

As described hereinabove, according to the present invention which a laminous structure of first, second and third magnetic films 11, 12 and 13, such three magnetic films are retained in a magnetically coupled state with one another at normal temperature, and when heated in a reproducing operation, the second magnetic film 12 functions to interrupt the magnetic coupling between the first and third magnetic films 11 and 13, thereby expanding or shrinking the data-recorded magnetic domain of the first magnetic film 11 to consequently improve the resolution S/N (C/N) of the reproduction output, and still the recording state can be held with regard to the third magnetic film 13. Therefore, after termination of the reproduction, the recording state can be restored to eventually ensure the satisfactory reproduction characteristics without impairing repeated reproduction.

Furthermore, since the present invention is capable of providing a sufficiently large reproduction output as mentioned above, it becomes possible to realize dimensional reduction of the data magnetic domains $B_M$ to consequently increase the recording density. Besides the above, even in another structure of the magneto-optical recording medium where track grooves are formed in its base, the data magnetic domains $B_M$ can still be reduced dimensionally. Therefore, the recording magnetic domains are formable not merely in land portions alone as in any ordinary medium but also in both land portions and track grooves, hence further enhancing the data recording density.

We claim as our invention:

1. A method of reproducing a signal of a recorded magnetic domain from a magneto-optical recording medium having a first magnetic film, a second magnetic film and a third magnetic film magnetically coupled to one another at room temperature $T_{RT}$, wherein the Curie points Tc1, Tc2 and Tc3 of said first, second and third magnetic films respectively, are in the relationship of Tc2>$T_{RT}$, Tc2<Tc1, and Tc2<Tc3, and the coercive force Hc1 of said first magnetic film is small in the vicinity of the Curie point Tc2 of said second magnetic film, while the coercive force Hc3 of said third magnetic film is sufficiently greater than a required magnetic field intensity within a temperature range between said room temperature $T_{RT}$ and a predetermined temperature $T_{PB}$ higher than the Curie point Tc2 of said second magnetic film, and in reproducing said signal from said magneto-optical recording medium, said medium is heated to said predetermined temperature $T_{PB}$ to interrupt the magnetic coupling between said first and third magnetic film under an application of a magnetic field by magnetic field generating means comprising demagnetizing magnetic fields or stray magnetic fields from the recording medium and an external magnetic field applying means for providing said required magnetic intensity to change a domain size in said first magnetic film.

2. A method of reproducing a signal of a recorded magnetic domain from a magneto-optical recording medium having a first magnetic film, a second magnetic film and a third magnetic film magnetically coupled to one another at room temperature $T_{RT}$, wherein the Curie points Tc1, Tc2 and Tc3 of said first, second and third magnetic films, respectively, have the relationship of $Tc2 > T_{RT}$ and $Tc2 < Tc1$, and $Tc2 < Tc3$, and the coercive force Hc1 of said first magnetic film is selected so as to be small in the vicinity of the Curie point Tc2 of said second magnetic film, and the coercive force Hc3 of said third magnetic film is selected to be larger than a requied minimum magnetic field intensity within a temperature range between said room temperature $T_{RT}$ and a predetermined temperature $T_{PB}$ which is higher than the Curie point Tc2 of said second magnetic film, and during the reproduction said signal from said magneto-optical recording medium, said medium is heated to said predetermined temperature with the application of a magnetic field from magnetic field generating means comprising demagnetizing magnetic fields or stray magnetic fields from the recording medium and external magnetic applying means for providing said required magnetic intensity to said first magnetic film so as to cause shrinking of the recorded magnetic domain.

3. A method of reproducing a signal of a recorded magnetic domain from a magneto-optical recording medium having a first magnetic film, a second magnetic film and a third magnetic film magnetically coupled to one another at room temperature $T_{RT}$, and wherein the Curie points Tc1, Tc2 and Tc3 of said first, second and third magnetic films respectively have the relationship of $Tc2 > T_{RT}$ and $Tc2 < Tc1$, and $Tc2 < Tc3$, and the coercive force Hc1 of said first magnetic film is selected so as to be small in the vicinity of the Curie point Tc2 of said second magnetic film, and while the coercive force Hc3 of said third magnetic film is selected to be larger than a required minimum magnetic field intensity within a temperature range between said room temperature $T_{RT}$ and a predetermined temperature $T_{PB}$ which is higher than the Curie point Tc2 of said second magnetic film, and during the reproduction of said signal from said magneto-optical recording medium, said medium is heated to said predetermined temperature $T_{PB}$ with the application of a magnetic field from magnetic field generating means comprising demagnetizing fields or stray magnetic fields from the recording medium and external magnetic field applying means for providing said required magnetic intensity to said first magnetic film so as to expand the recorded magnetic domain.

4. A method according to claims 1, 2 or 3, wherein said signal is obtained by detecting signal change upon change of the domain size.

* * * * *